Figure 5:
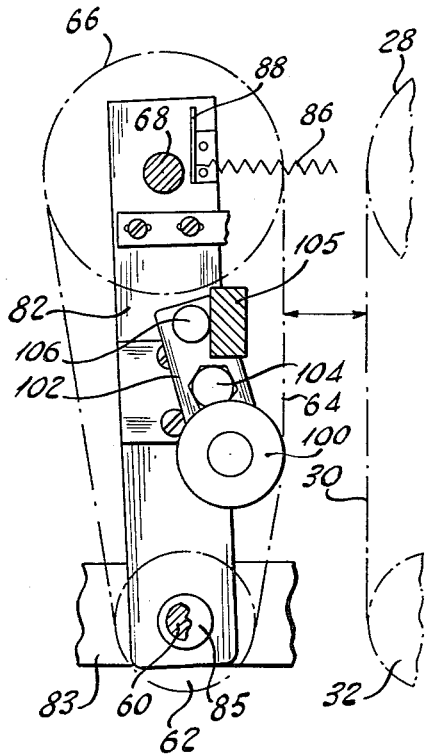

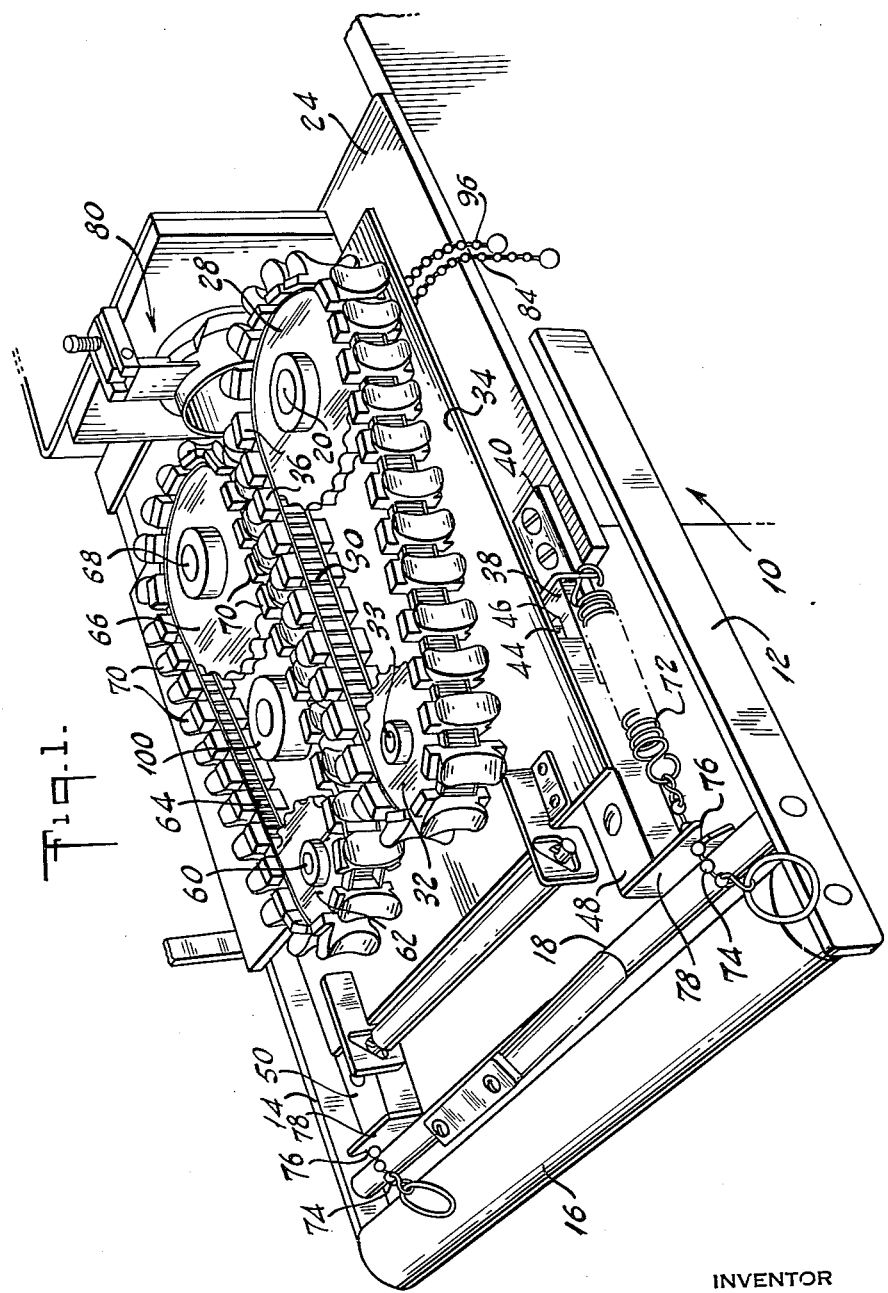

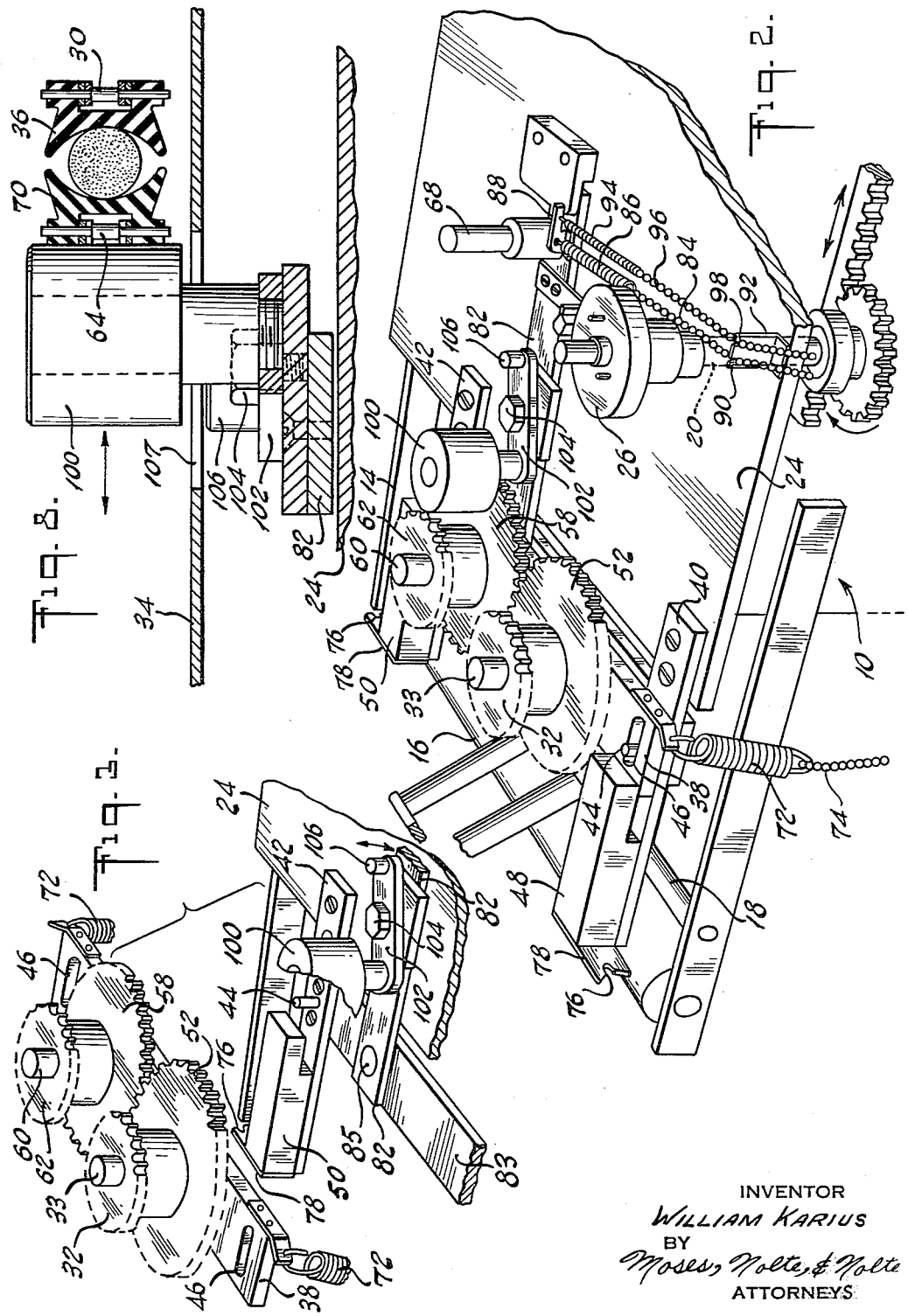

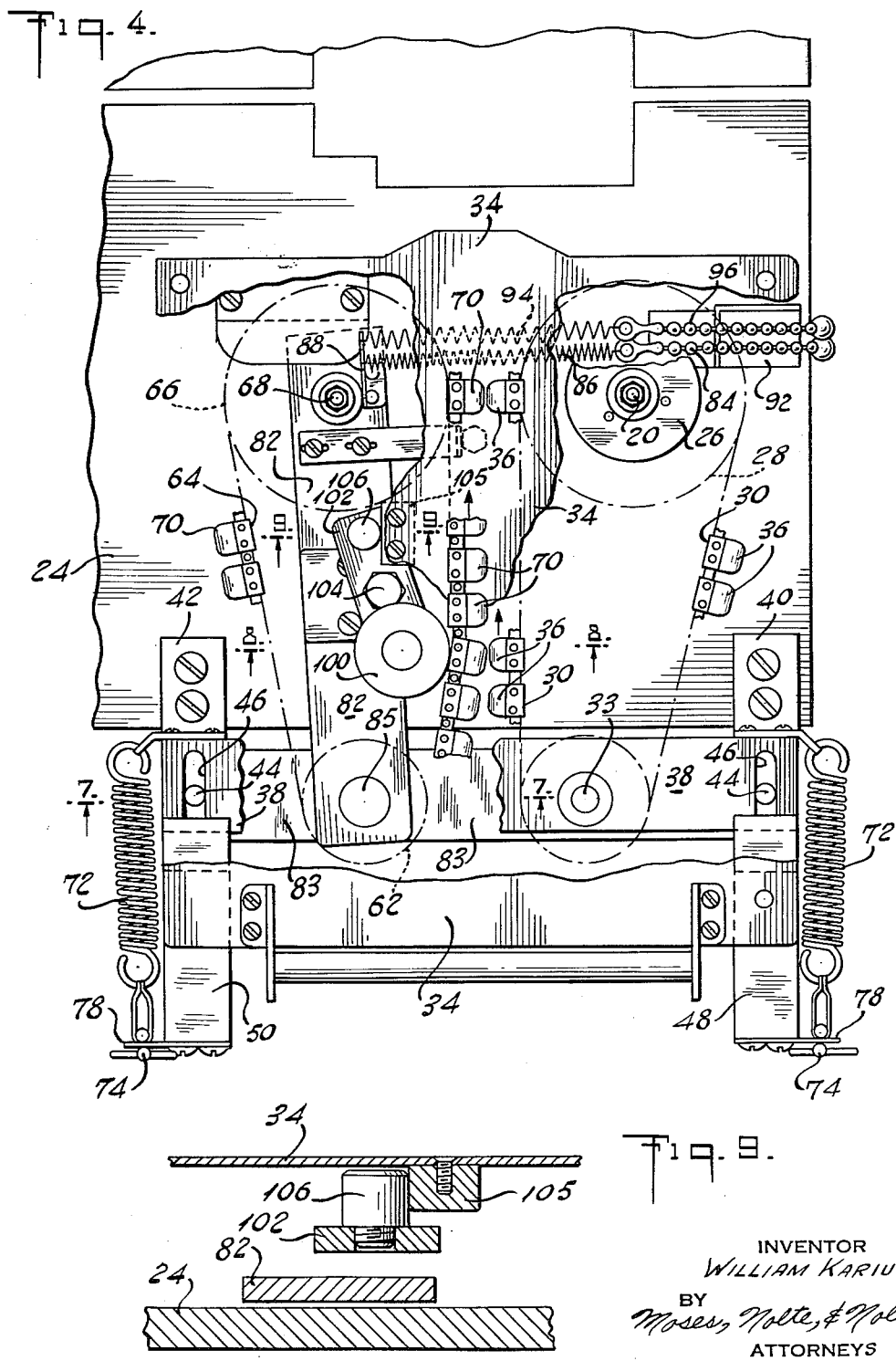

Sept. 18, 1962 W. KARIUS 3,054,545
SAUSAGE MAKING MACHINE
Filed March 16, 1960 4 Sheets-Sheet 4

INVENTOR
WILLIAM KARIUS
BY
Moses, Nolte, & Nolte
ATTORNEYS

United States Patent Office 3,054,545
Patented Sept. 18, 1962

3,054,545
SAUSAGE MAKING MACHINE
William Karius, Mountainside, N.J., assignor to Linker Machines, Inc., Newark, N.J., a corporation of New York
Filed Mar. 16, 1960, Ser. No. 15,461
13 Claims. (Cl. 226—172)

This invention relates in general to sausage making machines and in particular to a new and useful sausage making machine including adjustable mechanism for feeding a continuous cylindrical length of sausage prior to its being tied into individual sausages.

The present invention is particularly directed to mechanism for advancing a continuous length of sausage including a substantially cylindrical casing stuffed with meat into association with mechanism for tying the sausage into individual lengths. A prime requisite for such a conveyor feeding mechanism is that the sausages be gripped with uniform tension along the length of feed so that the sausage will not be overly compressed or the casing ruptured as the sausage length is fed. Difficulty has been encountered with mechanism of this type heretofore in that the lateral spacing of associated conveyor sets between which the sausage was fed was not uniformly spaced throughout the length of feed and therefore resulted in uneven feeding and stretching or compressing of the sausage casing and in some instances even rupture.

The present invention includes a sausage conveyor feeding mechanism including a pair of cooperating laterally spaced endless belt conveyor systems which cooperate to feed a continuous length of sausage therebetween. The arrangement is such that the sausage is uniformly and positively gripped throughout the length of sausage feed so that the sausage may be continuously advanced without stretching, compressing or rupturing the sausage casing. The mechanism includes means for adjusting the lateral spacing between cooperating conveyors in order to accommodate sausages of varying sizes including means to adjust the spacing between conveyors uniformly throughout the length of sausage feed so that the sausage is gripped with uniform pressure throughout the length of sausage feed. The mechanism includes a single conveyor lateral spacing adjustment means which may be easily adjusted to vary the spacing between the conveyor belts uniformly throughout an extended conveyor feed path.

The construction is such that the conveyors are resiliently mounted in both longitudinal and lateral directions and thus jamming of the mechanism by feeding large articles between the conveyors is not likely to result. The arrangement also affords a safety feature and an operator will not injure his hands if they are accidentally placed between the conveyors because the conveyors will be displaced against their resilient biasing.

Accordingly it is an object of this invention to provide a sausage feeding machine including cooperating laterally spaced conveyors between which the sausage is fed and means for adjusting the spacing between said conveyors a uniform amount throughout an elongated conveyor feed path.

A further object of this invention is to provide a sausage machine including a pair of laterally spaced endless chain conveyors including curved opposing members between which a tube of sausage is fed and including means to adjust the spacing between said opposed members along the length of feed of said endless chain conveyor.

A further object of the invention is to provide a sausage machine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 6:
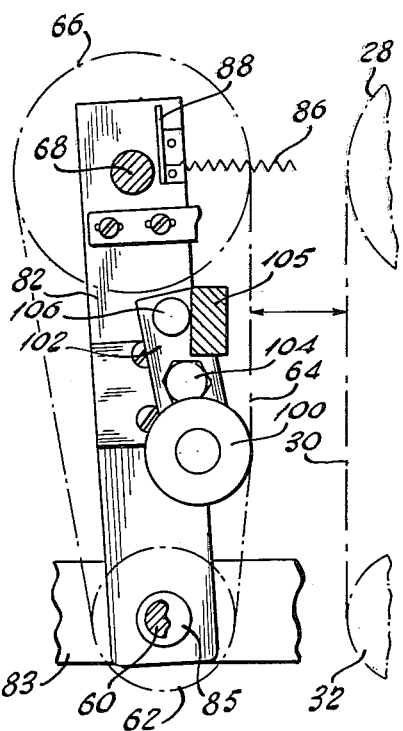
Figure 7:
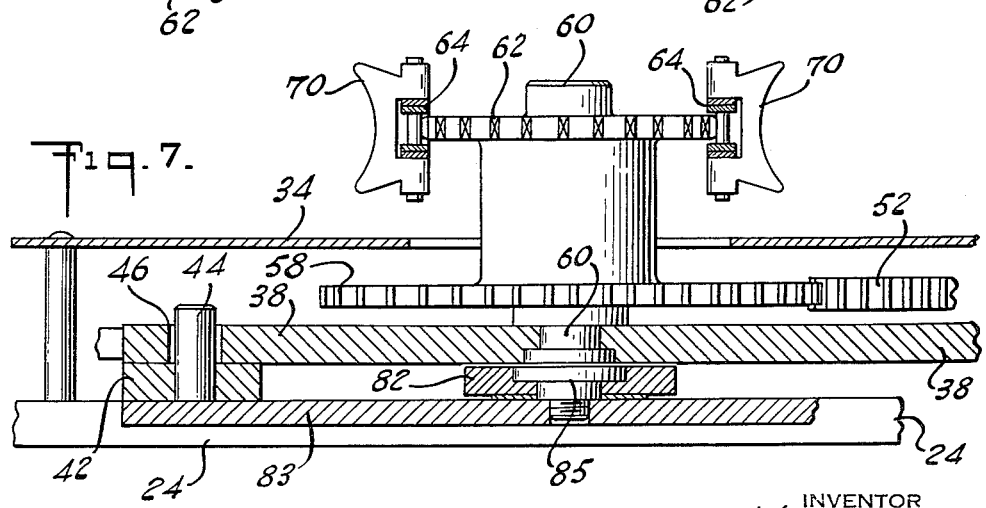

In the drawings:
FIG. 1 is a perspective view of a portion of a sausage making machine indicating a sausage feeding mechanism constructed in accordance with the invention;
FIG. 2 is a fragmentary perspective view similar to FIG. 1 but with portions of the machinery removed to show the operating mechanisms;
FIG. 3 is an exploded fragmentary perspective view of portions of the mechanism indicated in FIG. 2;
FIG. 4 is a fragmentary top plan with portions broken away for clarity of the mechanism indicated in FIG. 1;
FIG. 5 is a fragmentary top plan, partly in section of a portion of the conveyor sizing adjusting mechanism indicating the mechanism in its closely spaced position;
FIG. 6 is a view similar to FIG. 5 but indicating the mechanism in a widely spaced position;
FIG. 7 is a vertical section taken on the line 7—7 of FIG. 4;
FIG. 8 is a vertical section taken on the line 8—8 of FIG. 4; and
FIG. 9 is a vertical section taken on the line 9—9 of FIG. 4.

Referring to the drawings in particular the invention as embodied therein includes a mounting base 10 including a pair of longitudinally extending arms 12 and 14 which extend outwardly from the base 10 adjacent the top thereof and which support a large roller 16 at the end thereof and a smaller roller 18 spaced inwardly therefrom. These rollers 16 and 18 are provided for connection to other parts (not shown) of the sausage making machine which form no part of the present invention.

The mounting base 10 is provided with a prime mover such as an electric motor (not shown) to rotate a vertically disposed shaft 20 through a suitable set of gears 22. The shaft 20 is journalled for rotation in a vertical position in a top plate 24 and is provided with a hubbed disc portion 26 on top of which a sprocket gear 28 is affixed. Rotation of the shaft 20 by the prime mover effects rotation of the sprocket gear 28 which drives a sprocket chain 30 one end of which extends around the sprocket gear 28 and the other end of which extends around a sprocket gear 32 which is rotatably mounted on a vertical pin 33. The pin 33 and the shaft 20 extend through a slot in a cover plate 34.

The sprocket chain 30 includes outwardly extending pin members on each link which pivotally hold resilient sausage forming members 36. The inner surfaces of the resilient members are curved to present a smooth gripping surface on the sausage as the members are moved by the endless chain belt 30.

The pin 33 is mounted on a transverse member 38 which is slidable longitudinally on laterally spaced outwardly extending arms 40 and 42. For this purpose the arms 40 and 42 are provided with aligning pins 44 which extend into slots 46 of the transverse member 38. The arms 40 and 42 are also provided with slotted blocks 48 and 50 which include inwardly extending overhanging portions which rest on the top of the transverse member 38 and prevent its up and down movement.

A large gear 52 is rotatably supported by the pin 33 directly above the transverse member 38 and it meshes with a similar gear 58 rotatably suported by pin 60 to a set rotation of a sprocket gear 62 rotatably supported thereon. An endless chain belt 64 extends around the sprocket gear 62 and a sprocket gear 66 which is rotatably supported by a pin 68, the latter being mounted in a vertical position carried by a pivotal arm to be described more fully hereafter. The endless chain belt 64 is provided with resilient members 70 which move around with the endless chain belt 64 at a spaced location from the members 36.

The distance between the sprockets 32, 28 and the sprockets 62 and 66, and hence the tension on endless belts 30 and 64 may be varied by changing the position of the transverse member 38. In order to accomplish this, a coil spring 72 is connected at each end of the transverse member 38 and one end of the spring is connected to a bead chain 74. To correctly tension the endless belts 30 and 64, the bead chain 74 at each end of the transverse member 38 is pulled backwardly and hooked into an eyelet 76 of the laterally extending plates 78 affixed to the slotted blocks 48 and 50.

Sausage is fed between the cooperating resilient members 70 and 36 into association with tying mechanism generally designated 80, the latter forming no part of the present invention.

In accordance with the present invention the lateral spacing of the cooperating endless belts 30 and 64 and the members 36 and 70 thereon to accommodate sausages of varying diameter size is effected by means of a lever mounting arm 82 upon which the pin 68 is affixed. The other end of the mounting arm 82 is pivotally mounted on a transverse member 83. In accordance with the invention the arm 82 may be swung about its pivot 85 to bring the shaft 68 closer to the shaft 20 by pulling on a bead chain 84 which is connected by means of a large coil spring 86 to a bracket 88 affixed to the arm 82. Once the arm 82 is positioned the bead chain 84 is locked in an eyelet 90 of an upstanding bracket 92 affixed to the top plate 24. A second coil spring 94 of lesser holding force than the coil spring 86 is secured to the bracket 88 at one end and a bead chain 96 at its opposite end. The bead chain 96 is positioned in an eyelet 98 of the bracket 92. The second lower force spring 94 permits fine adjustment of the arm 82 in order to provide the desired clearance between the cooperating members 70 and 36 and tension on the chain belts 30 and 64 to effect the correct sausage sizing and weight.

In accordance with the invention when one end of the arm 82 is swung about its pivot on the transverse member 83 to move the end of the endless bell chain 64 toward the belt chain 30, the intermediate portion of the endless belt 64 is also swung a similar amount in order to insure that the spacing between the members 36 and 70 is uniform through the central area of feed of the sausages. This is accomplished by means of a roller member 100 which is moved outwardly against the endless belt chain 64 the same distance as the sprocket gear 66 is moved toward the sprocket gear 28. To accomplish this the roller 100 is mounted on a lever arm 102, which arm is pivoted on a bolt 104 at its center to arm 82 and is provided with an upstanding pin 106 which is free to move a distance which will bring it in against a depending portion 105 (FIG. 4) of a cover plate 34. The plate 34 is slotted at 107 (FIG. 8) to accommodate the roller 100. The roller 100 is normally held in contact with the endless belt 64 so that the upstanding pin is normally urged against the cover plate depending portion at all times. The arm 102 and the pivot location 104 is of such a size that movement of the shaft 68 toward or away from the shaft 20 will be effective to move the roller 100 a similar amount in a corresponding direction toward or away from the endless belt 64.

Thus, the invention provides a means for feeding sausage between resilient members 36 and 70 and for setting the mechanism to achieve a precise spacing therebetween to effect feeding of the sausage length without deforming it. Variations in the spacing between the resilient members may be achieved along a substantial length of the feed line by simple control mechanism. When sausages of a different size are to be made adjustments can be made by lifting the bead chain 84 or 96 out of the eyelets 90 and 98, respectively, in order to reposition the arm 82 and adjust the clearance between the resilient members 36 and 70 to vary the clearance therebetween.

Sausages are always fed with a uniform gripping pressure along the length of conveyor feed and hence no deformation of any kind will result to the sausages.

While a specific embodiment of the invention has been shown and described in detail to illustrate the application of the invention principles, it will be understood that the invention may be embodied otherwise without departing from such principles.

What is claimed is:

1. In a sausage feeding apparatus including a pair of spaced endless belt conveyors arranged upon a frame, said belt conveyors having aligned sausage engaging means affixed to their outer surfaces in opposed spaced relationship to define therebetween a substantially straight sausage feeding path, including spaced sets of sprocket wheels around which each of said endless belt conveyors is movable, the improvement comprising means to adjust the position of a single one of said sprocket wheels while maintaining the remaining sprocket wheels in fixed relative relation to vary the spacing between the outside of said belt conveyors, and compensating means responsive to the adjustment of the adjustable sprocket wheel to simultaneously adjust and maintain the spacing between the opposed sausage engaging means in substantially parallel relation for all positions of the adjustable sprocket wheel.

2. In a sausage feeding apparatus according to claim 1, wherein said compensating means includes a first arm upon which said adjustable sprocket wheel is mounted, said first arm being movable about a pivot point on said apparatus, a second arm pivotally mounted on said first arm intermediate the length of each of said arms, an upstanding member positioned at one end of said second arm, a stop affixed to the frame of said apparatus and positioned to limit movement of said upstanding member, an endless belt conveyor positioning member on the opposite end of said second arm extending upwardly therefrom and positionable in engagement with the inside surface of said endless conveyor belt, said second arm being of such a size and location on said first arm and said stop being located whereby movement of said adjustable sprocket to move said endless belt conveyor is effective to move the intermediate portion of said conveyor an amount substantially equal to the amount of movement of said adjustable sprocket wheel.

3. A sausage feeding machine comprising a first set of chain sprocket gears arranged in a fixed spaced location, a first endless belt extending around said first set of sprocket gears, a second set of sprocket gears in alignment with said first set, a second endless belt extending around said second set of sprocket gears and defining a path between said endless belts for the feeding of sausage therebetween, and means for adjusting the position of a single one of said sprocket gears in said second set while maintaining the remaining sprocket gears in fixed relative relation and means responsive to said adjusting means to move the intermediate portion of said second endless belt an amount substantially equal to the amount of movement of said adjustable sprocket gear.

4. A sausage feeding machine according to claim 3, wherein the one of said sprocket gears which is adjustable is mounted on an arm, said arm being pivotally mounted adjacent one end at a location spaced toward the opposite sprocket gear from said adjustable sprocket gear and wherein the means responsive to the adjusting means includes, endless belt positioning means connected to said arm and held in contact with the inside surface of said endless belt, and control means to move said endless belt positioning means substantially the same distance as, and in response to, movement of said adjustable sprocket gear when the latter is moved by repositioning said arm.

5. A sausage making machine including first and second longitudinally spaced sprocket gears, a first endless chain extending over said sprocket gears, third and fourth longitudinally spaced sprocket gears, a second endless chain extending around said third and fourth sprocket gears and arranged to oppose said first endless chain and to define therebetween a substantially straight sausage feeding path, means to adjust the position of said fourth sprocket gear while maintaining the first, second and third sprocket gears in fixed relative relation and compensation means to simultaneously adjust the intermediate portion of said second sprocket chain an amount substantially equal to the amount of adjustment of said fourth sprocket gear to maintain the path of the intermediate portion of the second endless chain after adjustment of the position of the fourth sprocket gear substantially parallel with its path prior to adjustment.

6. A sausage making machine including first and second conveyor means for feeding sausage therebetween in a substantially straight path, means to adjust the spacing between one end of said first and second conveyor means while maintaining the other ends of said first and second conveyor means in fixed relative relation, said adjusting means including means for moving the intermediate portion of one of said conveyor means an amount substantially equal to changes made in the spacing of said one end of said first and second conveyor means.

7. An apparatus according to claim 4, including a coil spring connected to said arm, a bead chain connected to said coil spring and means for anchoring said bead chain in a fixed location after said spring is tensioned.

8. An apparatus according to claim 7, including a second coil spring of lesser resilient force than said first first spring, a second bead chain connected to said second coil spring and means to anchor said bead chain to tension said spring and position said arm.

9. A sausage feeding apparatus comprising a pair of spaced sprocket wheels, a first endless conveyor belt extending around said sprocket wheels, a second pair of spaced sprocket wheels, a second endless conveyor belt extending around said second pair of sprocket wheels and movable through a path in spaced location to said first conveyor belt to define a substantially straight path therebetween for sausages, and means to adjustably position one of the sprocket wheels of said first set in relation to the corresponding sprocket wheel of said second set whereby to change the clearance between said first conveyor belt and said second conveyor belt at the location of said sprocket wheel, and means responsive to movement of said adjustable sprocket wheel to move the intermediate portion of said associated conveyor belt an amount corresponding to movement thereof caused by movement of said sprocket wheel, said means responsive to movement of said adjustable sprocket wheel including a pivotally mounted arm, a lever pivotally mounted on said arm intermediate the length thereof, said adjustable sprocket wheel being mounted adjacent one end thereof and said arm being pivotable adjacent the other end thereof, upstanding endless conveyor belt positioning means connected to one end of said lever, stop means positioned to limit movement of the opposite end of said lever, said upstanding endless conveyor belt positioning means being moved about said lever pivot an amount in proportion to the movement of said adjustable sprocket wheel about the pivot of said arm.

10. An apparatus according to claim 9, including means to bias the end of said arm opposite said pivot toward said endless chains.

11. The combination according to claim 10 wherein said biasing means includes a large coil spring and a bead chain connected to said coil spring and held in a stationary portion of said machine.

12. An apparatus according to claim 5, including longitudinally movable mounting means for said first and third sprocket gears, and bias means urging said mounting means away from said second and fourth sprocket gears to maintain said first and second endless chains under tension.

13. An apparatus according to claim 12 wherein said bias means is adjustable.

References Cited in the file of this patent

UNITED STATES PATENTS 2,875,890    Good _____ Mar. 3, 1959

FOREIGN PATENTS 584,866    Germany _____ Sept. 27, 1933